US012579501B2

(12) United States Patent (10) Patent No.: US 12,579,501 B2
Strömberg et al. (45) Date of Patent: Mar. 17, 2026

(54) TRANSPORT ASSET MONITORING SYSTEM FOR MONITORING OPERATING STATES OF ONE OR MORE TRANSPORT ASSETS AND A METHOD TO BE EXECUTED IN THE TRANSPORT ASSET MONITORING SYSTEM

(71) Applicant: VOLVO TRUCK CORPORATION, Gothenburg (SE)

(72) Inventors: Bo Strömberg, Västra Frölunda (SE); Per Sohlberg, Hovås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/756,510

(22) Filed: Jun. 27, 2024

(65) Prior Publication Data

US 2025/0013973 A1    Jan. 9, 2025

(30) Foreign Application Priority Data

Jul. 4, 2023    (EP) ..................................... 23183386

(51) Int. Cl.
*G06Q 10/08*        (2024.01)
*G06Q 10/0833*        (2023.01)
(Continued)

(52) U.S. Cl.
CPC ........ *G06Q 10/0833* (2013.01); *H04W 4/029* (2018.02); *H04W 4/40* (2018.02)

(58) Field of Classification Search
CPC .... G06Q 20/145; G06Q 50/40; G06Q 20/322; G06Q 20/3255
(Continued)

(56) References Cited

U.S. PATENT DOCUMENTS 11,162,447 B2    11/2021    Kim
11,235,781 B2    2/2022    Hashimoto et al.
(Continued)

FOREIGN PATENT DOCUMENTS

CN        113537881 A        10/2021
CN        114248781 A        3/2022
(Continued)

OTHER PUBLICATIONS

Deshmukh, Dhananjay; "Technologies shaping the development of Off-Highway products—Part 1 of the Off-Highway Product Series", Jul. 14, 2022, 10 pages (Year: 2022).*
(Continued)

*Primary Examiner* — Shannon S Campbell
*Assistant Examiner* — Freda A Nelson
(74) *Attorney, Agent, or Firm* — Jeffri A. Kaminski; Venable LLP

(57)        ABSTRACT

A transport asset monitoring system for monitoring operating states of one or more transport assets is provided. The transport asset monitoring system has at least one control unit configured to associate a respective state machine with each of the one or more transport assets. Each state machine implements a plurality of operating states, out of which operating states at least one state can be categorized as a productive state and at least one state can be categorized as an unproductive state. The transport asset monitoring system also has a sensor system to detect a current operating state for each state machine. The control unit aggregates the current operating states of a plurality of transport assets such that a transport asset utilization for the one or more transport assets is determined.

14 Claims, 5 Drawing Sheets

(51) Int. Cl.
*H04W 4/029* (2018.01)
*H04W 4/40* (2018.01)

(58) Field of Classification Search
USPC ............................................. 705/6, 13, 333
See application file for complete search history.

(56) References Cited

U.S. PATENT DOCUMENTS

| | | | | |
|---|---|---|---|---|
| 2007/0124050 | A1* | 5/2007 | Donnelli | G07C 5/008 |
| | | | | 701/50 |
| 2013/0046525 | A1* | 2/2013 | Ali | G05D 1/0221 |
| | | | | 703/6 |
| 2016/0292846 | A1* | 10/2016 | Sprock | G06T 7/001 |
| 2018/0225895 | A1* | 8/2018 | Oda | G07C 5/008 |
| 2019/0035171 | A1* | 1/2019 | Jayanthi | H04M 1/72457 |

| | | | | |
|---|---|---|---|---|
| 2020/0172384 | A1 | 6/2020 | Cadou | |
| 2020/0223359 | A1 | 7/2020 | Manci et al. | |
| 2022/0171385 | A1* | 6/2022 | Cui | H04W 4/46 |
| 2023/0058169 | A1 | 2/2023 | Cella et al. | |

FOREIGN PATENT DOCUMENTS

| | | | | |
|---|---|---|---|---|
| EP | 3637212 A2 * | 4/2020 | .......... | G07C 5/0866 |
| JP | 7005526 B2 * | 1/2022 | .......... | B60W 30/165 |
| JP | 2022149796 A | 10/2022 | | |
| WO | WO-2019005742 A1 * | 1/2019 | ............. | H04W 4/44 |

OTHER PUBLICATIONS

Extended European Search Report in corresponding European Application No. 23183386.4 dated Dec. 14, 2023 (10 pages).

* cited by examiner

TRANSPORT ASSET MONITORING SYSTEM FOR MONITORING OPERATING STATES OF ONE OR MORE TRANSPORT ASSETS AND A METHOD TO BE EXECUTED IN THE TRANSPORT ASSET MONITORING SYSTEM

TECHNICAL FIELD

The disclosure relates generally to transport assets. In particular aspects, the disclosure relates to a transport asset monitoring system for monitoring operating states of one or more transport assets and a method to be executed in the transport asset monitoring system. The disclosure can be applied to heavy-duty transport vehicles, such as trucks, buses, and trailers, semi-trailers and rigids, among other vehicle types. Although the disclosure may be described with respect to a particular vehicle, the disclosure is not restricted to any particular vehicle.

BACKGROUND

The society of today is strongly dependent on efficient vehicle transport. The movement of, for example, goods, cargo and materials may involve several types of transport, such as pre-carriage to a seaport by a truck, main carriage over sea by an ocean-going vessel, and on-carriage by trucks to a distribution center or a like. All links in the distribution chain are important for safe and efficient transport. Thus, competitive and cost-effective transportation services rely on efficient operations, well-structure and maintained infrastructure. Today's transport and distribution networks are, however, large and complex making it difficult to design and oversee. To this end, the transport operations often involve fleets of transport assets for which there is a complex interdependency between different sub-tasks that needs to be performed in the transportation chain. Specialized transport assets may further be needed for performing different tasks. By way of example, transportation of materials or goods, may involve several steps of loading on a truck or trailer at a production site or factory, unloading at distribution centers or warehouses and reloading into trucks or vans for distribution to vendors or end consumers. There is therefore a need for coordinated and collaborative efforts by various transport assets. To reduce transportation costs and delivery times there is further a need for a more efficient utilization of the transport assets.

SUMMARY

According to a first aspect of the disclosure, there is provided a transport asset monitoring system for monitoring operating states of one or more transport assets; wherein the transport asset monitoring system comprises at least one control unit configured to associate a respective state machine with each of the one or more transport assets; wherein each state machine implements a plurality of operating states, out of which operating states at least one state can be categorized as a productive state and at least one state can be categorized as an unproductive state; wherein the transport asset monitoring system further comprises a sensor system configured to detect a current operating state for each state machine; and wherein the control unit is configured to aggregate the current operating states of a plurality of transport assets such that a transport asset utilization for the one or more transport assets is determined.

The first aspect of the disclosure may seek solve a problem of inaccurate monitoring of transport assets. A technical benefit may include improved tracking of one or more transport assets. A further technical benefit may be improved utilization of one or more transport assets. A more accurate determining of an operating state may further be provided. Put differently, an improved categorization of the operating state pertaining to the one or more transport assets may be achieved.

To this end, using the operating states from a plurality of transports assets may provide a better estimate of the utilization and flow of transport assets. By aggregating the current operating states of more than one transport assets a more precise determining of the operating state of a transport asset may be provided. The system therefore provides a more accurate determining of transport asset utilization than if determining only the utilization of a single transport assets, e.g. by a vehicle logbook system.

The transport utilization may be a transport utilization factor or ratio. The wording "transport asset utilization" should be interpreted broadly. Measures of transport utilization may include mileage or hours, i.e. distance per transport asset per time period or operational hours/days per vehicle per period. By considering productive and unproductive states a more reliable determining of the transport utilization may be achieved.

The transport asset monitoring system may result in a state machine which transitions between states as time progresses. The occupancy pattern of various states and the transitions between states may provide valuable input to management systems for evaluation and continuous improvement of workflows involving the transport assets. For instance, the amount of productive time associated with a given transport asset may be determined by monitoring the transitions of the state machine, and keeping track of how much time is spent in a given state or a given category of states.

Optionally in some examples, including in at least one preferred example, the one or more transport assets comprises at least one heavy-duty transport vehicle, and wherein the transport asset monitoring system is configured to determine the transport asset utilization for the at least one heavy-duty transport vehicle. A technical benefit may include a better utilization of a heavy-duty transport asset among a number of transport assets. A more efficient planning of a task to be performed by a heavy-duty transport vehicle. By way of example, an increased understanding of how to allocate and design transport routes for heavy-duty transport vehicles may thereby be obtained. A more efficient flow of heavy-duty transport vehicles may thereby be obtained. The number of heavy-duty transport vehicles needed may thereby be reduced. A more cost-efficient transportation chain may also be provided.

Optionally in some examples, including in at least one preferred example, one or more state machines are implemented on respective portable wireless devices. A technical benefit may include that the state machine executes, e.g., on a smart phone or a tablet device which an operator brings with him or her at the start of the work shift. These devices are separate from the actual transport asset, and can therefore be used in an agnostic manner when it comes to type of transport asset, brand, or version. It is an advantage that the state machines do not require complex updates to existing transport assets. Some or all state machines may also be executed on in-vehicle control units, or at least partly on remote devices such as cloud-based server solutions and the like. Each portable wireless device may be associates with a transport asset.

Optionally in some examples, including in at least one preferred example, the one or more state machines are implemented on-board a transport asset.

Optionally in some examples, including in at least one preferred example, the one or more of transport assets is comprising a transport asset selected from a group comprising boats, airplanes, trains, cars, trucks, trailers, semi-trailers and rigids.

Optionally in some examples, including in at least one preferred example, the transport asset monitoring system is at least partly implemented on a remote server accessible via wireless link from the transport assets and/or from associated wireless devices. A technical benefit may include that a flexible communication within the transport asset monitoring system may be obtained. An easier scaling of number of transport assets and/or associated wireless devices may be achieved.

Optionally in some examples, including in at least one preferred example, a transition between two states (S1, S2, S3) of a first state machine in the transport asset monitoring system is conditioned on a current state (X1, X2) of an associated second state machine. A technical benefit may be that this allows for definitions of interdependencies between two or more state machines to form a more complex system of state machines. The first and the second state machine may, by the at least one control unit, be grouped as a pair of connected state machines.

Optionally in some examples, including in at least one preferred example, the at least one control unit is arranged to categorize the current operating state of at least one state machine as productive or as unproductive based on the current operating state of at least one other state machine. A technical benefit may include a more accurate categorization of the current operating state. For instance, a given transport asset may only be categorized as being in a productive state if also a number of other transport assets are productive. A correlation between state machines are thereby provided. The at least one state machine may be associated with a first transport asset and the at least other state machine may be associated with a second transport asset. The second transport asset being different from the first transport asset.

Optionally in some examples, including in at least one preferred example, the at least one control unit is further arranged to determine a correlation between the operating states in one of the state machines with respect to the operating states of another state machine, and to detect a dependency between two transport assets based on the correlation. A technical benefit may include that an improved detection of associated operating states of between two or more transport assets may be achieved. A better determining of interrelated task performed by the transport assets may further be achieved.

Optionally in some examples, including in at least one preferred example, the categorization of the current operating state of at least one state machine as productive or as unproductive is based on a correlation between the current operating state of a state machine of one transport asset and the current operating state of another state machine of another transport asset. A technical benefit may include that an improved detection of associated operating states of between two or more transport assets may be achieved. A better determining of interrelated task performed by the transport assets may further be achieved. A more reliable categorization may be provided.

Optionally in some examples, including in at least one preferred example, the sensor system comprises one or more positioning systems associated with respective state machines. A technical benefit may include that parameters pertaining to the position and/or relative positions of one or more transport assets may be used for detecting dependence between transport assets. The one or more positioning systems may be based on, e.g., proximity to landmarks, global positioning systems, and other means of localization can be used to obtain information about the current operating state of a given transport asset.

Optionally in some examples, including in at least one preferred example, the categorization of the current operating state of at least one state machine as productive or as unproductive is further based on position data from the one or more positioning systems, wherein the position data comprises at least a position associated with a state machine of one transport asset and another state machine of another transport asset. A technical benefit may include that a more accurate determining of a current operating state may be achieved. To this end, parameters pertaining to the position and/or relative positions of one or more transport assets may be used for detecting dependence between transport assets and/or correlation between operating states of one or more transport assets. To this end, the position data may comprise at least a position associated with a state machine of one transport asset and one or more state machine of a plurality of other transport assets.

Optionally in some examples, including in at least one preferred example, the transport asset monitoring system is further configured to monitor one or more material handling assets, wherein the material handling assets are associated with one or more transport assets and wherein the system is configured to associate a respective state machine with each of the material handling assets; wherein each of the respective state machine implements a plurality of operating states of the one or more material handling assets; and wherein the transport asset monitoring system is configured to aggregate the current operating states of the plurality of transport assets and of the material handling assets such that a transport asset utilization for the one or more transport assets is determined. A technical benefit may include that a more accurate determining of the utilization of one or more transport assets may be achieved. The current operating states of material handling assets may further provide data pertaining to the dependency between the current operating states of associated transport assets and material handling assets.

The positioning systems may be associated with respective state machines of the one or more material handling assets.

The material handling assets may comprise an asset selected from the group of storage systems, industrial trucks, and bulk material handling equipment. The industrial truck may be a forklift. The industrial truck may alternatively be a container lift truck. The material handling asset may be an equipment selected from a group comprising of a forklift, a container lift truck, a conveyor belt, a crane and a pallet jack. By way of example, the material handling asset may be arranged to lift and/or move materials over a short-distance such as when loading or unloading a transport asset. The material handling may be understood to involve short-distance movement within confines such as within a site, building, factory area or between such and a transport asset. To this end, the forklift may also be referred to as a forklift truck. By way of example, the industrial truck may be a hand truck or a power truck. The material handling asset may be understood to be a manual, semi-automated or automated material handling equipment arranged to aid in the movement, protection, storage and control of materials and goods, e.g. in or after manufacturing or for distribution such as loading and/or unloading.

Optionally in some examples, including in at least one preferred example, one or more state machines are implemented on respective portable wireless devices, each portable wireless device may be associates with a material handling asset. These devices are separate from the actual material handling asset, and can therefore be used in an agnostic manner when it comes to type of material handling asset, brand, or version.

The categorization of the current operating state of at least one state machine as productive or as unproductive is further based on position data from the one or more positioning systems, wherein the position data comprises at least a position associated with a state machine of at least one transport asset and at least another state machine of one transport asset.

The sensor system may comprise one or more on-board vehicle sensor systems associated with respective state machines.

Optionally in some examples, including in at least one preferred example, the categorization of the current operating state of at least one state machine as productive or as unproductive is based on a correlation between the current operating state of a state machine of one transport asset and the current operating state of another state machine of one material handling asset. A technical benefit may include that a more efficient utilization of the one or more transport assets may be achieved. Put differently, data pertaining to the current operating state of a state machine of a material handling asset may be used to correlated to the operating state of a state machine of a transport asset. An improved accuracy in determine the flow of tasks performed by a plurality of transport assets and/or material handling assets may be obtained. An improved determining of the flow of assets and task performed by the respective assets may thereby be provided.

The transport asset monitoring system may optionally also be arranged to determine correlation between the occupied states in one of the state machines with respect to the occupied states of another state machine, and to detect a dependency between a transport asset and a material handling asset based on the correlation. This allows an operator of some transport asset to determine more complex interdependencies between the various operations of the transport and/or the material handling assets during a task performed at least one of the assets.

Optionally in some examples, including in at least one preferred example, the current operating state comprises a state selected from the group of transporting, loading, unloading, stationary, waiting, underway and maintenance.

Optionally in some examples, including in at least one preferred example, the sensor system comprises one or more of sensors each associated with a material handling asset of the one or more of material handling assets such that the current operating state of the respective material handling asset is detected. Such sensors may range from pressure sensors, hydraulic system transducers, and other forms of actuator signals which can be used to determine a current operating state of a material handling asset. The one or more sensors may be arranged to determining speed, acceleration and/or load of the material handling asset. A technical benefit may include that a more precise determining of the current operating state may be achieved. A more accurate to aggregation of current operating states of a plurality of transport assets and/or material handling assets may be achieved. As a result, a more accurate determining of a transport asset utilization for the one or more transport assets may be determined.

According to a second aspect of the disclosure, there is provided a computer implemented method executed in a transport asset monitoring system, for monitoring current operating states of one or more transport assets, the method comprising: associating a respective state machine which each asset in the one or more transport assets, wherein each state machine implements a plurality of operating states, out of which operating states at least one state is categorized as a productive state and at least one state is categorized as an unproductive state; detecting a current operating state for each state machine based on output data from a sensor system configured to detect the current operating state for each state machine; and aggregating the current operating states of a plurality of transport assets such that a transport asset utilization for the one or more transport assets is determined. The second aspect of the disclosure may seek to provide an efficient method for determining the utilization of one or more transport assets in a transport asset management system. The above-mentioned features of the transport asset management system, when applicable, apply to this second aspect as well. In order to avoid undue repetition, reference is made to the above.

Optionally in some examples, including in at least one preferred example, the transport asset monitoring system is further configured to monitor one or more material handling assets, wherein the material handling assets are associated with one or more transport assets, wherein the method further comprises associating a respective state machine with each of the material handling assets; wherein each of the respective state machine implements a plurality of operating states of the one or more material handling assets; and aggregating the current operating states of the plurality of transport assets and of the material handling assets such that the transport asset utilization for the one or more transport assets is determined.

According to a third aspect of the disclosure, a computer program comprising program code means for performing the steps of the second aspect is provide, wherein the program is run on a computer or on processing circuitry of at least one control unit. The above-mentioned features pertaining to the first and second aspects, when applicable, apply also to this third aspect. In order to avoid undue repetition, reference is made to the above.

Optionally, a non-transitory computer-readable storage medium is provided, the storage medium comprising instructions, which when executed by the processing circuitry, cause the processing circuitry to perform the method of the second aspect.

Optionally, a remote server comprising processing circuitry arranged to execute the method of the second aspect.

Optionally, a wireless device comprising processing circuitry arranged to execute the method of the second aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
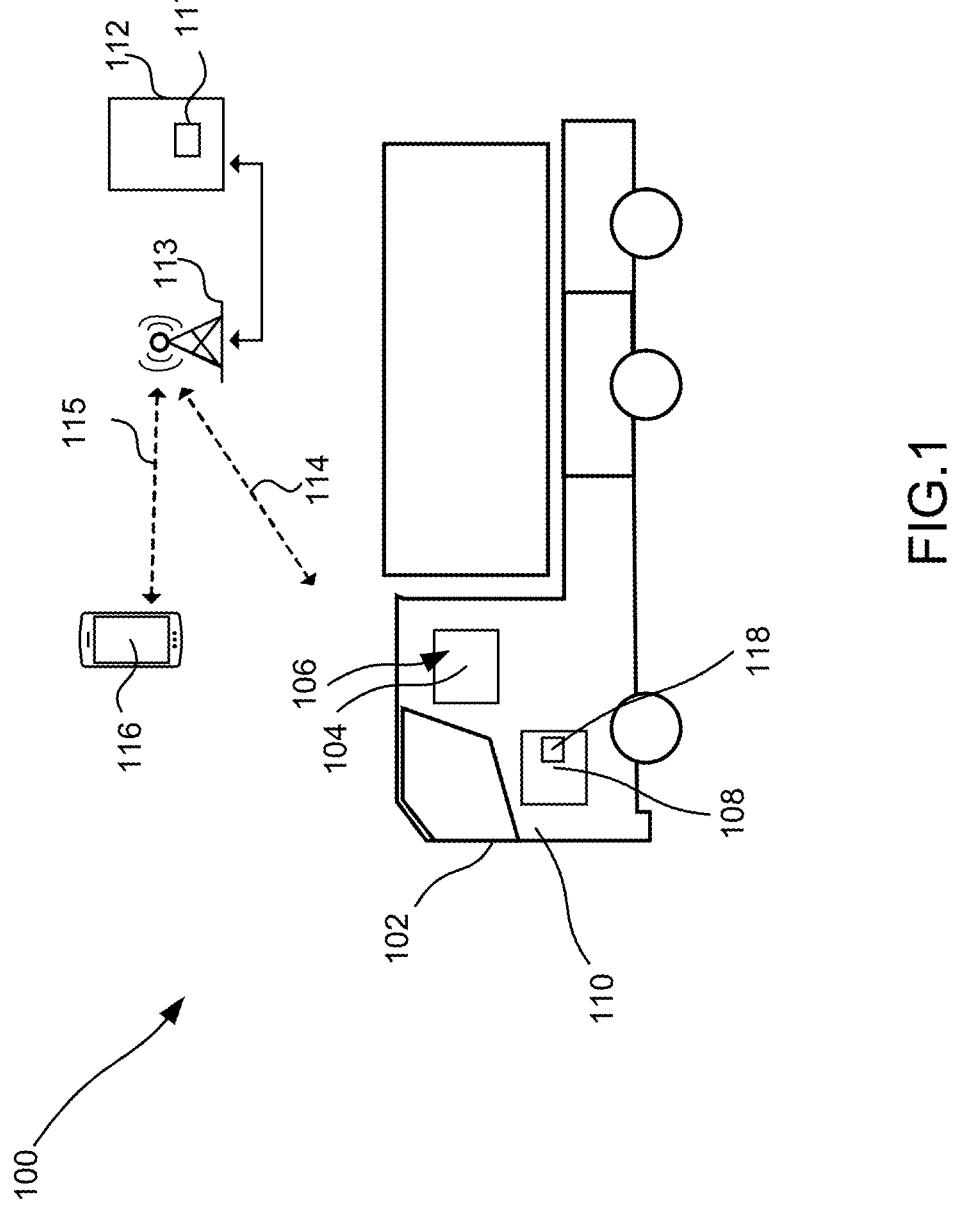
FIG. 1 is an exemplary schematic drawing of a transport asset monitoring system for monitoring operating states of one or more transport assets according to an example.

FIG. 1 is an exemplary schematic drawing of a transport asset monitoring system for monitoring operating states of one or more transport assets according to an example. In more detail, FIG. 1 shows the transport asset monitoring system 100 for monitoring operating states of one or more transport assets 102. The transport asset monitoring system 100 comprises at least one control unit 104 configured to associate a respective state machine with each of the one or more transport assets 102. Each state machine implements a plurality of operating states 106, out of which operating states at least one state can be categorized as a productive state and at least one state can be categorized as an unproductive state. The transport asset monitoring system 100 further comprises a sensor system 108 configured to detect a current operating state for each state machine. The control unit 104 is configured to aggregate the current operating states of a plurality of transport assets such that a transport asset utilization for the one or more transport assets 102 is determined.

By way of example, the one or more transport assets is here exemplified by a heavy-duty transport vehicle 110. The heavy-duty transport vehicle 110 is here exemplified as a truck. The truck is arranged to transport goods, cargo or materials such a building-materials between different locations.

The transport asset monitoring system 100 may further be configured to determine the transport asset utilization for the at least one heavy-duty transport vehicle 110.

The transport asset monitoring system 100 may at least partly implemented on a remote server 112 accessible via wireless link 114 from the transport assets 102 and/or from associated wireless devices 116.

The control unit 104 may be arranged in the transport asset and may be in communication with the remote server 112 via wireless link 114 over an access point 113 that could form part of a cellular access network such as a fifth generation (5G) or sixth generation (6G) wireless access network. The access point 113 may form part of a public and/or private communication network. The public and/or private communication network may utilize one or more communication networks technologies such as cellular network communication and/or wireless network communication.

The sensor system 108 may comprise one or more positioning systems 118 associated with respective state machines. The truck may, for example, be deployed to transport goods from a logistic center to a warehouse. The goods may therefore be loaded onto the truck at one location and unloaded at a different location. Data pertaining to the location of the truck during loading/unloading may, by the positioning system 118 be associated with a state machine associated with the truck.

A transport asset 102, such as the heavy-duty vehicle 110, may be associated with a number of different operating states. For instance, the transport asset 102 may be associated with a transporting state where the transport asset 102 is transporting material from one site to another site, a loading state where material is being loaded onto the transport asset 102, and an unloading state where material is being unloaded from the transport asset 102. Both loading, transporting, and unloading can be categorized as productive states where the transport asset 102 is contributing to the transport mission it is part of. The transport asset 102 may also be associated with one or more unproductive or passive states, such as a waiting state where the transport asset 102 is waiting to get loaded or unloaded, a turned-off state where the transport asset 102 is powered down, and/or a blocked state where the transport asset 102 is prevented from operating or is forced to operate at reduced speed due to traffic, on-site personnel, or other form of blockages.

With further reference to FIG. 1, the transport asset management system 100 may comprise one or more sensors in the sensor system 108. It has been realized that various forms of sensors 108 and also wireless communication systems involving the transport assets can be used to detect which operating state out of a plurality of operating states that a transport asset is currently in. Various sensor technologies can be used for the purpose, including pressure transducers configured to detect when hydraulic elements of a transport asset are being actively used, microphones or vibration sensors arranged to detect when a machine is operating, positioning systems that may determine when the transport asset 102 is moving, or is located at some key location associated with a given type of activity, such as refueling or maintenance operations. A sensor system 108 arranged to sense the loading weight and/or changed in loading weight may, for example, be used to determine the current operating state for the transport asset 102. By way of example, such a sensor system 108 may be used to determine if the truck is being loaded or onloaded. Put differently, the sensor system 108 may comprise one or more of sensors each associated with a transport asset of the one or more of transport assets such that the current operating state of the respective transport asset is detected.

To this end, this disclosure relates to various implementations of a state machine on one or more transport assets where the states can be detected and logged by means of, e.g., on-board sensors, external sensors, asset positioning systems, and communication links to other transport assets. The state machine of a given transport asset is then continuously updated as the asset is performing different tasks or is being prevented from performing a task due to some external circumstances, such as a traffic jam, equipment service and maintenance, and equipment failure. The state machine can be used by a transport asset management system for evaluating performance and utilization on both asset level and application level. The transport asset management system can for instance be used to evaluate a relative percentage of productive state occupancy in relation to unproductive state occupancy, where of course it is desired to keep the level of productive state occupancy as high as possible in relation to the unproductive state occupancy.

A state machine and devices for detecting which state a given transport asset may currently in can be implemented in various manners, ranging from a realization in a portable wireless device such as a smartphone, GPS tacker, IoT device or tablet device, to dedicated vehicle sensors, processing and human-machine interface, HMI. External data can also be gathered, e.g., via vehicle to vehicle, V2V, and vehicle to infrastructure, V2I, wireless communication systems, often collectively referred to as vehicle to anything, V2X, communication. The different transport asset states can then be uploaded to a central processing unit or can be processed locally, possibly in a distributed manner of processing.

A state detection arrangement for each transport asset may also be implemented in a site system or "cloud platform", e.g., on the remote server 112 as a collection of state machines 117, which is gathering data from assets involved in a given transport flow or transport mission. The site system then processes the information and generates reports to relevant stakeholders.

Data can be transferred within the transport asset monitoring system in real time, near real time or at fixed intervals depending on the need for follow-up of the current efficiency in a given transport mission. Data can also be transferred on-demand or triggered by the occurrence of some predetermined event.

It is generally understood that many different types of sensors can be used to detect and/or to indirectly infer in which state a given state machine is in. Positioning systems are suitable for determining where a given transport asset is currently located, and can thereby be used to infer a current operating state of the asset. Position sensors may comprise satellite system receivers such as global positioning system receivers (GPS), or local positioning systems such as proximity sensors or vision-based systems such as vision-based registration plate readers and various forms of radio-frequency ID (RFID) systems. For instance, a transport asset located at a workshop, servicing center, or refueling station can be assumed to be in an unproductive operating state, i.e., not currently contributing to the general progress of the transport mission to which it has been assigned. On the other hand, a transport asset en route from one site to another site is most likely performing a productive task of transporting some cargo or material, unless some other sensor indicates that the transport asset is currently unloaded, or if no goods or digital waybill is associated with the transporting asset.

The relations between sensor signals and the states of each state machine can be predetermined or adapted over time. For instance, the states and associated state transitions of a given state machine may be associated with a set of fixed manually configured rules that define the operations of the state machine in response to various forms of sensor signals. For instance, a simple state machine may comprise an active state and an inactive state, where the active state of the state machine is entered as soon as the transport asset is performing some sort of operation, e.g., is operating is hydraulic system as detected by a pressure transducer, or is moving as detected by an on-board positioning system.

The relations between sensor signals and the states of each state machine can also be adapted over time, perhaps as part of an artificial intelligence system which is configured by training. Such training may then comprise sensor signal inputs along with ground truth, i.e., a set of state transitions which have been either manually configured or pre-recorded.

The state machine configuration for a given type of transport asset, including the rules for transitioning between states, can be pre-configured at the start of a transportation chain, e.g., as part of the transport planning.

Figures 2, 3:
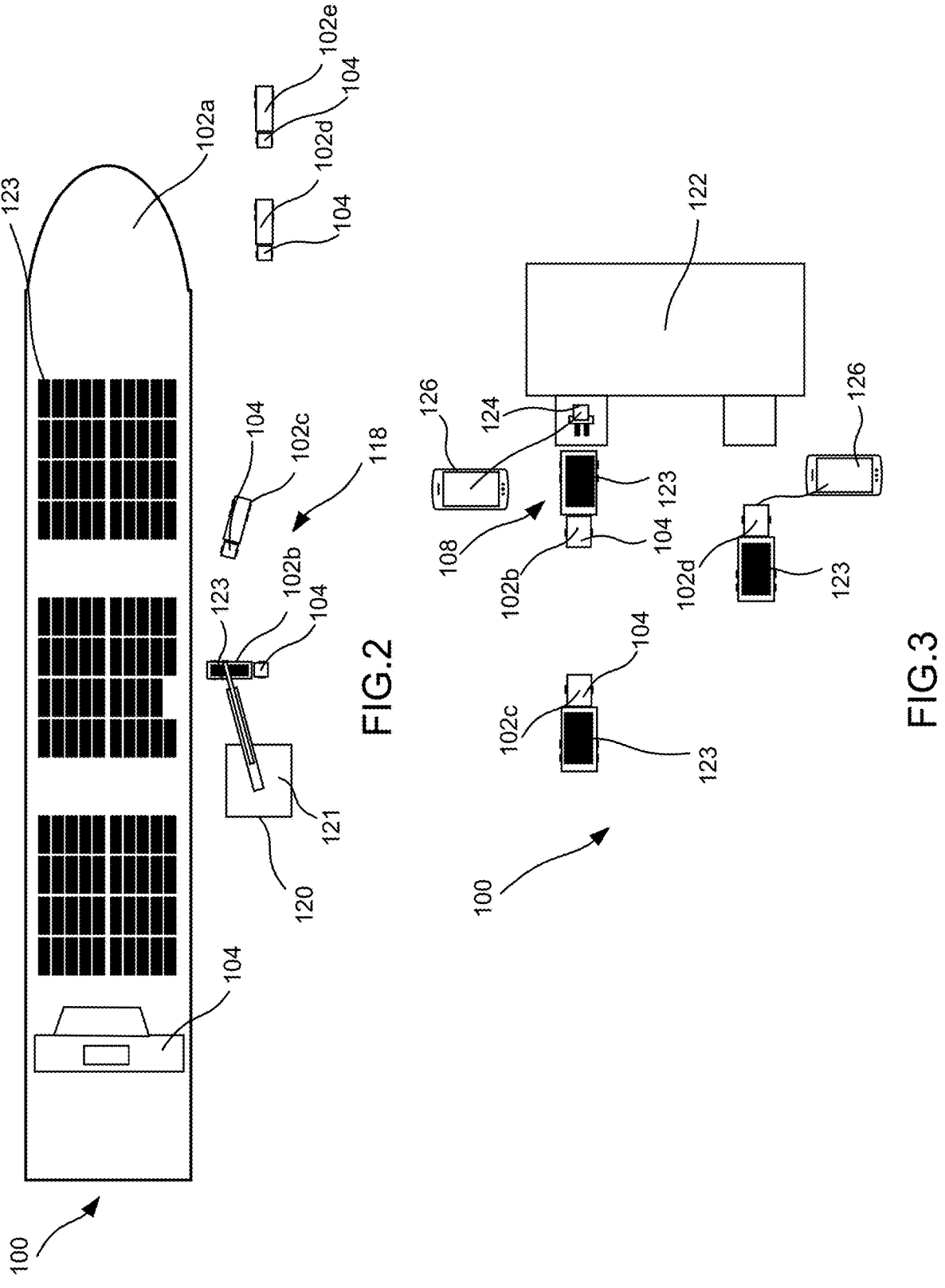
FIG. 2 is an exemplary schematic drawing of a transport asset monitoring system for monitoring operating states of one or more transport assets according to other examples.
FIG. 3 is an exemplary schematic drawing of a transport asset monitoring system for monitoring operating states of one or more transport assets according to yet other examples.

FIG. 2 is an exemplary schematic drawing of a transport asset monitoring system for monitoring operating states of one or more transport assets according to an example. In more detail, FIG. 2 illustrates a transport asset monitoring system 100 comprising a plurality of transport assets 102. The plurality transport assets 102 are here exemplified as a ship 102*a*, and a number of trucks 102*b* to 102*e*. The transport monitoring system 100 is exemplified to be implemented at a cargo loading or unloading site. The trucks 102*b* to 102*e* may be heavy-duty transport vehicles arranged to carry load unloaded from the ship 102*a* and to transport to the load to an unloading site such as a distributor site. The transport asset management system 100 is configured to aggregate the current operating states of the plurality of transport assets such that a transport asset utilization for one or more transport assets is determined. Put differently, the utilization of one or more of the trucks 102*b* to 102*e* may thereby be efficiently determined. The utilization of the ship 102*a* may also be determined.

To this end, the at least one control unit 104 may be arranged to categorize the current operating state of at least one state machine as productive or as unproductive based on the current operating state of at least one other state machine.

The transport asset monitoring system 100 in FIG. 2 is further configured to monitor one or more material handling assets 120, wherein the material handling assets 120 are associated with one or more transport assets 102. The additional asset 120 is here exemplified as a crane 121 arranged to unload cargo 123 from the ship 102*a* to the trucks 102*b* to 102*c*.

The transport asset management system 100 is, moreover, configured to associate a respective state machine with each of the material handling assets 120 and each of the respective state machine implements a plurality of operating states of the one or more material handling assets 120. The transport asset monitoring system 100 is further configured to aggregate the current operating states of the plurality of transport assets 102 and of the material handling assets 120 such that a transport asset utilization for the one or more transport assets 102 is determined. Put differently the current state of the material handling asset 120 may be determined in an efficient manner.

The categorization of the current operating state of at least one state machine as productive or as unproductive may be based on a correlation between the current operating state of a state machine of one transport asset 102 and the current operating state of another state machine of one material handling asset 120. By way of example, the truck 102*b* may be in a productive state as it is being loaded by the material handling asset 120, i.e. the crane 121. The crane 121 may further be in a productive state as it is actively unloading cargo 123 from the ship 102a. To this end, a correlation between the current operating states of the truck 102b and the crane 121 allows for a more accurate determining of the current state of the truck 102b. The correlation may in this example be used to determine whether a truck 102b or 102c is standing still waiting to be loaded, which may be determined as an unproductive state, or is standing still and is being loaded, which may be determined as a productive state. Put differently, the truck 102b may be in a productive state when it is correlated with the operating state of the crane 121. If the crane 121 would be standing still, i.e. in an unproductive state, and not loading cargo to the truck 102b, the truck 102b would instead be understood to be in an unproductive state as it is waiting to be loaded.

To this end, the categorization of the current operating state of at least one state machine as productive or as unproductive may further based on position data from the one or more positioning systems, wherein the position data comprises at least a position associated with a state machine of one transport asset 102a and another state machine of another transport asset 102b. This is here exemplified as the ship 102a being in a productive state as it is being unloaded and the truck 102b being in a productive state as it is being loaded by the crane 121.

This may further be exemplified by the trucks 102c to 102e being categorized to both be in unproductive states as they are waiting next to each other in line to drive to the crane 121 where they are to be loaded. In more detail, the position data for the state machines associated with the respective trucks 102c and 102e may indicate that the two trucks 102c, 102e are located close to each other and are moreover separated from the position of the truck 102b and/or the crane 121.

To this end, the position data may comprise data pertaining to a relative position between two or more transport assets. By way of example, a transport asset being first in line to access a port of a loading terminal may be categorized as productive whereas a truck second or third in line may be categorized as unproductive, i.e. waiting in line. The waiting in line, may, however be categorized as a productive operating state if the waiting time is less than a threshold time value for waiting. Put differently, if a threshold for maximum waiting time is exceeded the operating state may be categorized as unproductive.

To this end, the at least one control unit 104 may further be arranged to determine a correlation between the operating states in one of the state machines with respect to the operating states of another state machine, and to detect a dependency between two transport assets 102a, 102b based on the correlation.

The categorization of the current operating state of at least one state machine as productive or as unproductive may be based on a correlation between the current operating state of a state machine of one transport asset 102a and the current operating state of another state machine of another transport asset 102b. Alternatively, a correlation between the current operating state of transport asset 102b and 102c may be used to categorize the current operating state of the at least one of the transport assets 102b or 102c.

Alternatively, or in combination the current operating state of at least one state machine as productive or as unproductive may further based on position data from the one or more positioning systems 118, wherein the position data comprises at least a position associated with a state machine of the transport asset 102b and another state machine of another transport asset 102c. This may be exemplified as the truck 102b being in a productive state as it is being loaded whereas the truck 102c is in an unproductive state as it is waiting to be loaded.

To this end, the categorization of the current operating state of at least one state machine as productive or as unproductive is further based on position data from the one or more positioning systems, wherein the position data comprises at least a position associated with a state machine of one transport asset, e.g. the truck 102b and another state machine of the material handling asset, e.g. the crane 121.

The current operating state has in this example been exemplified as being loading or unloading. The current operating state may in other examples comprise a state selected from the group of transporting, loading, unloading, stationary, waiting, underway and maintenance.

FIG. 3 is an exemplary schematic drawing of a transport asset monitoring system for monitoring operating states of one or more transport assets according to an example. In more detail, FIG. 3 shows the transport asset monitoring system 100 for monitoring operating states of one or more transport assets 102. The transport asset management system 100 is arranged to determine transport asset utilization for a plurality of transport assets 102. The plurality of transport assets 102 may be the same as trucks 102b, 102c, 102d as described in relation to FIG. 2. The plurality of trucks 102b, 102c, 102d have according to the example illustrated in FIG. 3 reached a terminal 122 where cargo 123 from the trucks 102b, 102c, 102d are unloaded. FIG. 3 further illustrates a material handling asset 120 in the form of a forklift 124. The forklift 124 is arranged to unload cargo from the trucks 102b, 102c, 102d. Based on the above, truck 102b is in a productive state as it is being unloaded by the forklift 124. The forklift 124 may be understood to be associated with the truck 102b. The trucks 102c and 102d may be in unproductive states as they are waiting to get access to the terminal 122. By way of example, a transport asset positioned at the terminal or gate that is ready for unloading or loading is associated with a productive state. In contrast, a transport asset being at site but not positioned at terminal or gate is associated with an unproductive state.

As described above the transport asset monitoring system 100 further comprises a sensor system configured to detect a current operating state for each state machine. The sensor system may comprise one or more vehicle cameras for imaging the vehicle and/or the surrounding of the vehicle. By way of example, the operating state of the truck 102d may be categorized as being unproductive based on image data acquired by a vehicle camera of the truck 102d. In more detail, the position of the truck 102d relative to the terminal 122 may be determined based on the image data from the vehicle camera. In this example the truck 102d is oriented with the front of the truck 102d towards the terminal 122 rather than away from the terminal 122 which is desired for unloading the truck 102d.

The one or more state machines may be implemented on respective portable wireless devices. This is exemplified in FIG. 3 by way of example, as a mobile phone 126 associated with the forklift 124. In more detail, the one or more state machines is preferably implemented on the portable wireless device 126. This means that the state machine executes, e.g., on a mobile phone, also referred to as a smart phone, or a tablet device which an operator brings with him at the start of the work shift. These devices may be separate from the material handling asset, i.e. the forklift 124 here exemplified, and can therefore be used in an agnostic manner when it comes to type of material handling asset, e.g. brand or version. Alternatively, or in combination, a portable device such as a mobile phone 126 may be associated with the operator, e.g. the driver of the transport asset. The movement of the operator in and out of a load area may, by way of example, be determined. It is an advantage that the state machines do not require complex updates to existing material handling assets. A more flexible and dynamic selection of material handling assets to be used in a transport mission may thereby be achieved.

To this end, one or more state machines associated with the transport assets 102 may be implemented on-board the respective transport asset. Of course, according to some embodiments, some or all state machines associated with the transport assets may be can also be executed on wireless devices exemplified by the portable wireless device 126 associated with the truck 102d, or at least partly on remote devices such as cloud-based server solutions and the like and in-vehicle control units.

The categorization of the current operating state of at least one state machine as productive or as unproductive may be based on a correlation between the current operating state of a state machine of one transport asset 102c and the current operating state of another state machine of another transport asset 102b.

The categorization of the current operating state of at least one state machine as productive or as unproductive may be based on a correlation between the current operating state of a state machine of one transport asset 102c and the current operating state of another state machine of another transport asset 102b.

The sensor system 108 may also comprise one or more V2X communication systems associated with respective state machines as mentioned above. A V2V, V2I, or V2X system can be used to exchange data between different assets, and this data can be used to update the various state machines associated with some type of asset interaction. material handling asset. By way of example, a categorized productive state of the forklift 124 may be indicative of that the state of the associated transport asset, e.g. truck 102b is in a productive state, i.e. loading.

It is also appreciated that a V2X system can be used to force a state transition in a transport asset. For instance, a fork-lift loading a transport asset may communicate with the transport asset via V2X and trigger a state change into a loading state in the state machine of the transport asset. Once the loading is done a state transition can be forced which places the state machine of the transport asset in some other state than the active loading state, e.g. a transporting state.

To this end, the truck 102b may comprise one or more sensors forming part or the sensor system 108 and configured to determine the load or a change to the load exerted on the truck 102b. By way of example, current operating state, e.g. loading or unloading for the truck 102b may be correlated with the current operating state of the forklift 124. According to some examples, the truck 102b may be categorized as being in a productive state, e.g. loading. The sensors of the truck 102b may further be used to determine a state of the forklift 124 as a productive state of the forklift 124 during loading will change the load on the truck 102b.

Figure 4:
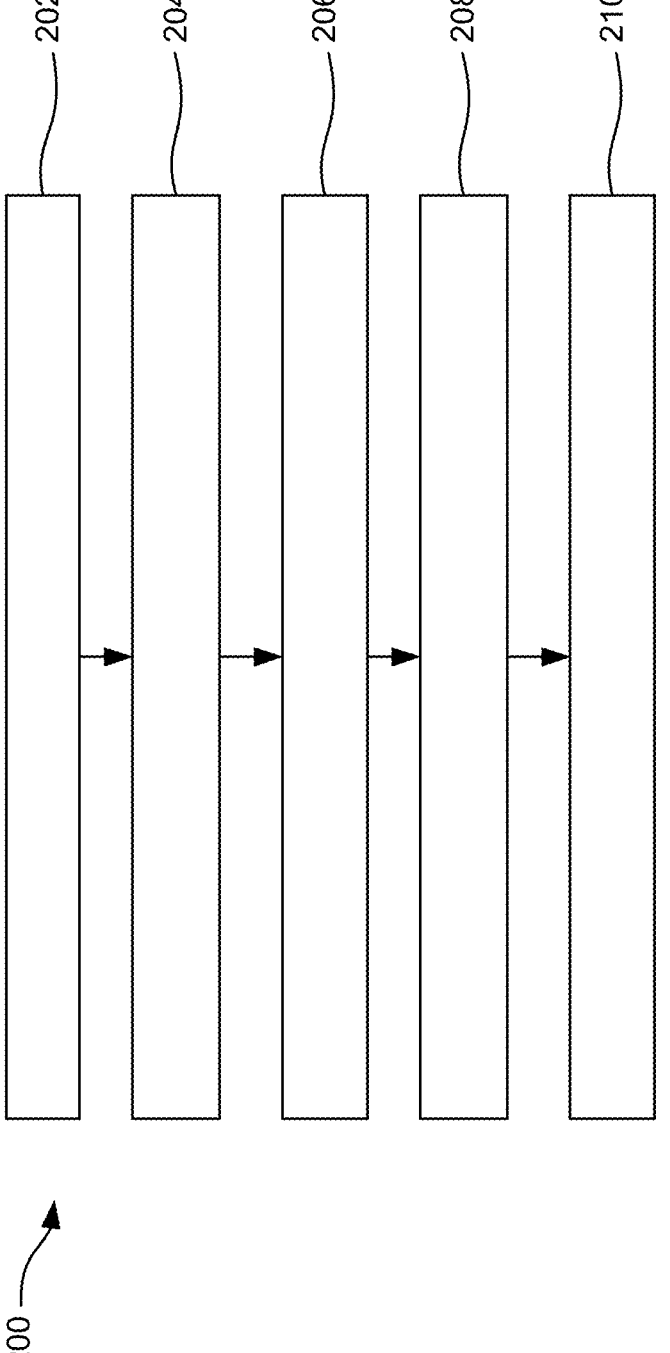
FIG. 4 illustrates a flow chart of an exemplary computer implemented method executed in a transport asset monitoring system according to some examples.

FIG. 4 illustrates a flow chart of an exemplary computer implemented method executed in a transport asset monitoring system, for monitoring current operating states of one or more transport assets 102 as described above. The method 200 comprising: associating 202 a respective state machine which each asset in the one or more transport assets 102, wherein each state machine implements a plurality of oper-ating states, out of which operating states at least one state is categorized as a productive state and at least one state is categorized as an unproductive state; detecting 204 a current operating state for each state machine based on output data from a sensor system 108 configured to detect the current operating state for each state machine; and aggregating 206 the current operating states of a plurality of transport assets 102 such that a transport asset utilization for the one or more transport assets is determined.

It is appreciated that the various optional aspects of the above discussed techniques can be incorporated as parts of the method in a straightforward manner. The method 200 can be performed on any of the above discussed processing devices, i.e., in the at least one control unit 104, on the remote server 112, and/or on the wireless device 116, see e.g. FIG. 1. It is furthermore appreciated that the method 200 can be distributed over more than one processing unit, and also over more than one type of processing unit.

With further reference to FIG. 4 and the disclosure above, the transport asset monitoring system 100 may further be configured to monitor one or more material handling assets 120, wherein the material handling assets 120 are associated with one or more transport assets 102, wherein the method further comprises associating 208 a respective state machine with each of the material handling assets 120; wherein each of the respective state machine implements a plurality of operating states of the one or more material handling assets 120; and aggregating 210 the current operating states of the plurality of transport assets 102 and of the material handling assets 120 such that the transport asset utilization for the one or more transport assets 102 is determined.

Figures 5, 6, 7, 8:
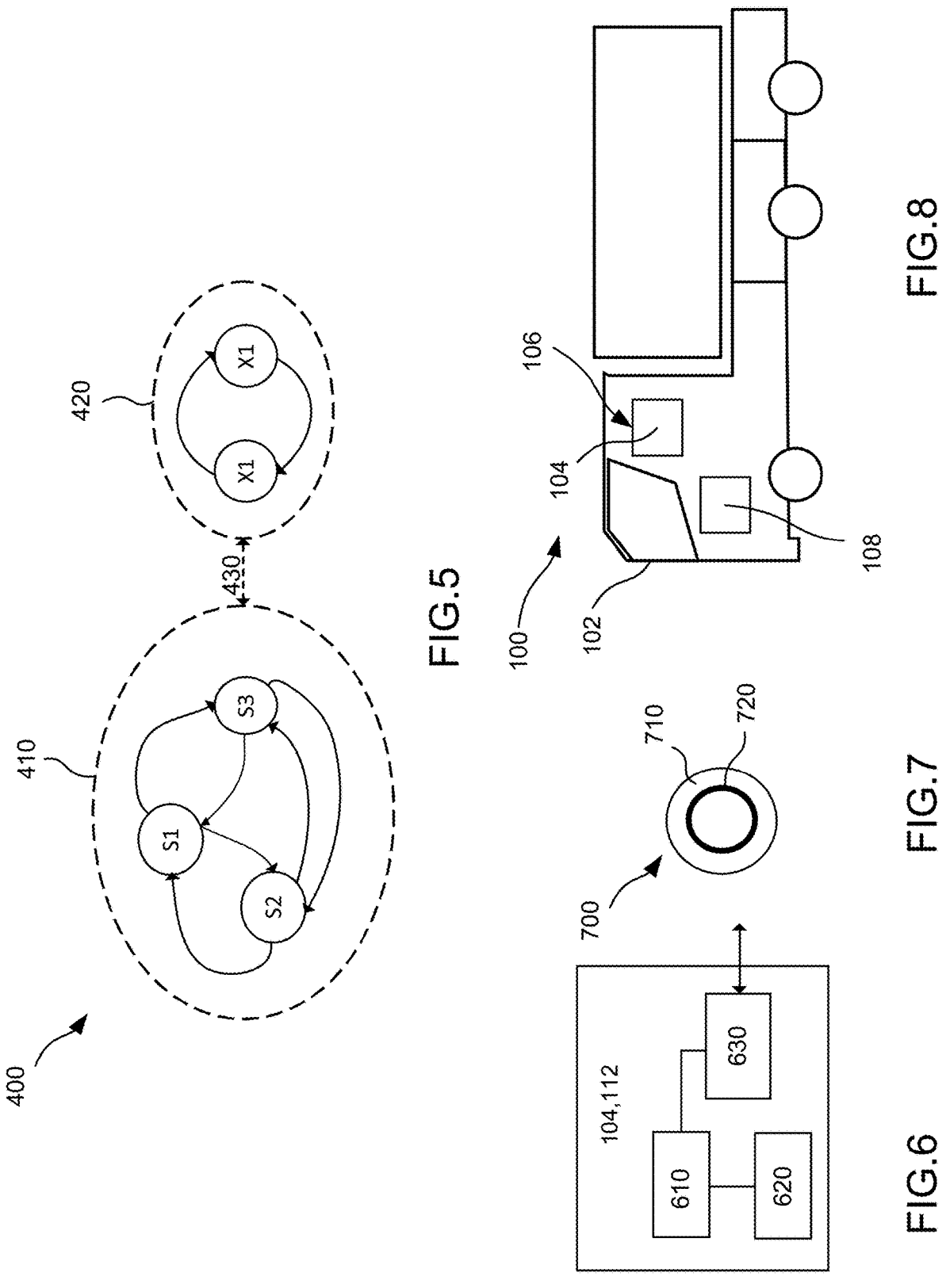
FIG. 5. is an exemplary schematic drawing of a state machine associated with some transport asset according to some examples.
FIG. 6 is an exemplary schematic drawing of in terms of a number of functional units, components of a control unit or a remote server.
FIG. 7 is an exemplary schematic drawing of computer program product according to some examples.
FIG. 8 is another view of FIG. 1, according to an example.

FIG. 5 schematically illustrates an example state machine 400 associated with some transport asset 102 described above. The state machine 400 comprises a set of internal states 410, here denoted as S1, S2 and S3, and also a set of external states, here denoted as X1 and X2. The two sets of states are optionally in some form of dependency 430 with respect to each other.

Put differently, a transition between two states S1, S2, S3 of a first state machine 410 in the transport asset monitoring system 100 is conditioned on a current state X1, X2 of an associated second state machine 420. For instance, suppose state S3 is associated with a loading state, then the state machine 410 may be configured to only enter this state in case another transport asset is on a given state, say X1. For instance, suppose that the state transitions between states S1, S2, and S3 are governed by geographical position, and that state S1 is an unproductive state (or subset of states). Then, the state machine may only transition into state S3 if there is an active material handling asset such as a material handling asset nearby tasked with loading material onto the transport asset. If this is not the case, then the transport asset will be placed in state S1 since it is inactive at the loading site and waiting to receive cargo or material for transport away from the site. Thus, generally, a transition between two states S1, S2, S3 of a first state machine 410 in the transport asset monitoring system is optionally conditioned on a current state X1, X2 of an associated second state machine 420.

The state machines of the different transport assets transition between states over time. Sometimes a dependency arises between the states of one state machine and the states of another state machine. This type of dependency can be very interesting from an efficiency management point of view. The transport asset monitoring systems discussed herein are optionally arranged to determine a correlation between the occupied states in one of the state machines with respect to the occupied states of another state machine, and to detect a dependency between two transport assets based on the correlation. The state machines may moreover be associated with one or more transport assets or material handling assets. Correlation can, for instance, be determined from a relatively straight forward time series analysis of the transitions in one state machine compared to the transitions in another state machine. In case a dependency is identified, it can be used to investigate the root cause of a given inefficiency in a transportation flow. Suppose for instance that a dependency between the state machine of a conveyor belt or a forklift and the state machines of a group of transport assets is detected. Suppose further that the state machines of the transport assets such as heavy-duty transport vehicles are detected as entering into an unproductive state in correlation with the state transitions of the conveyor belt or forklift. This may be indicative of an inefficiency that can perhaps be remedied by adding another conveyor belt or forklift to the operation, or by reconfiguration of the transportation strategies in the overall transportation chain or transport mission.

The one or more material handling assets may comprise an asset selected from the group of storage systems, industrial lifts, and bulk material handling equipment.

FIG. 6 schematically illustrates, in terms of a number of functional units, the components of the at least one control unit 104 such as the VUC or the remote server 112. The at least one control unit 104 may be configured to execute at least some of the functions discussed above for control of a transport asset such as a heavy-duty transport vehicle 110. Processing circuitry 610 is provided using any combination of one or more of a suitable central processing unit CPU, multiprocessor, microcontroller, digital signal processor DSP, etc., capable of executing software instructions stored in a computer program product, e.g. in the form of a storage medium 620. The processing circuitry 610 may further be provided as at least one application specific integrated circuit ASIC, or field programmable gate array FPGA.

Particularly, the processing circuitry 610 is configured to cause the at least one control unit 104 to perform a set of operations, or steps, such as the methods discussed in connection to FIG. 4. For example, the storage medium 620 may store the set of operations, and the processing circuitry 610 may be configured to retrieve the set of operations from the storage medium 620 to cause the at least one control unit 104 to perform the set of operations. The set of operations may be provided as a set of executable instructions. Thus, the processing circuitry 610 is thereby arranged to execute methods as herein disclosed.

The storage medium 620 may also comprise persistent storage, which, for example, can be any single one or combination of magnetic memory, optical memory, solid state memory or even remotely mounted memory.

The at least one control unit 104 may further comprise an interface 630 for communications with at least one external device. As such the interface 630 may comprise one or more transmitters and receivers, comprising analogue and digital components and a suitable number of ports for wireline or wireless communication.

The processing circuitry 610 controls the general operation of the control unit, e.g., by sending data and control signals to the interface 630 and the storage medium 620, by receiving data and reports from the interface 630, and by retrieving data and instructions from the storage medium 620. Other components, as well as the related functionality, of the control node are omitted in order not to obscure the concepts presented herein.

A computer program comprising program code means for performing the steps of the method 200 may further be provided, wherein the program is run on a computer or on processing circuitry of at least one control unit 104. To this end, FIG. 7 illustrates a computer readable medium 710 carrying a computer program comprising program code means 720 for performing the methods illustrated in FIG. 4, when said program product is run on a computer. The computer readable medium and the code means may together form a computer program product 700.

FIG. 8 is another view of FIG. 1, according to an example. FIG. 8 shows a transport asset monitoring system 100 for monitoring operating states of one or more transport assets 102; wherein the transport asset monitoring system 100 comprises at least one control unit 104 configured to associate a respective state machine with each of the one or more transport assets 102; wherein each state machine implements a plurality of operating states 106, out of which operating states at least one state can be categorized as a productive state and at least one state can be categorized as an unproductive state; wherein the transport asset monitoring system 100 further comprises a sensor system 108 configured to detect a current operating state for each state machine; and wherein the control unit 104 is configured to aggregate the current operating states of a plurality of transport assets such that a transport asset utilization for the one or more transport assets 102 is determined.

Figure 9:
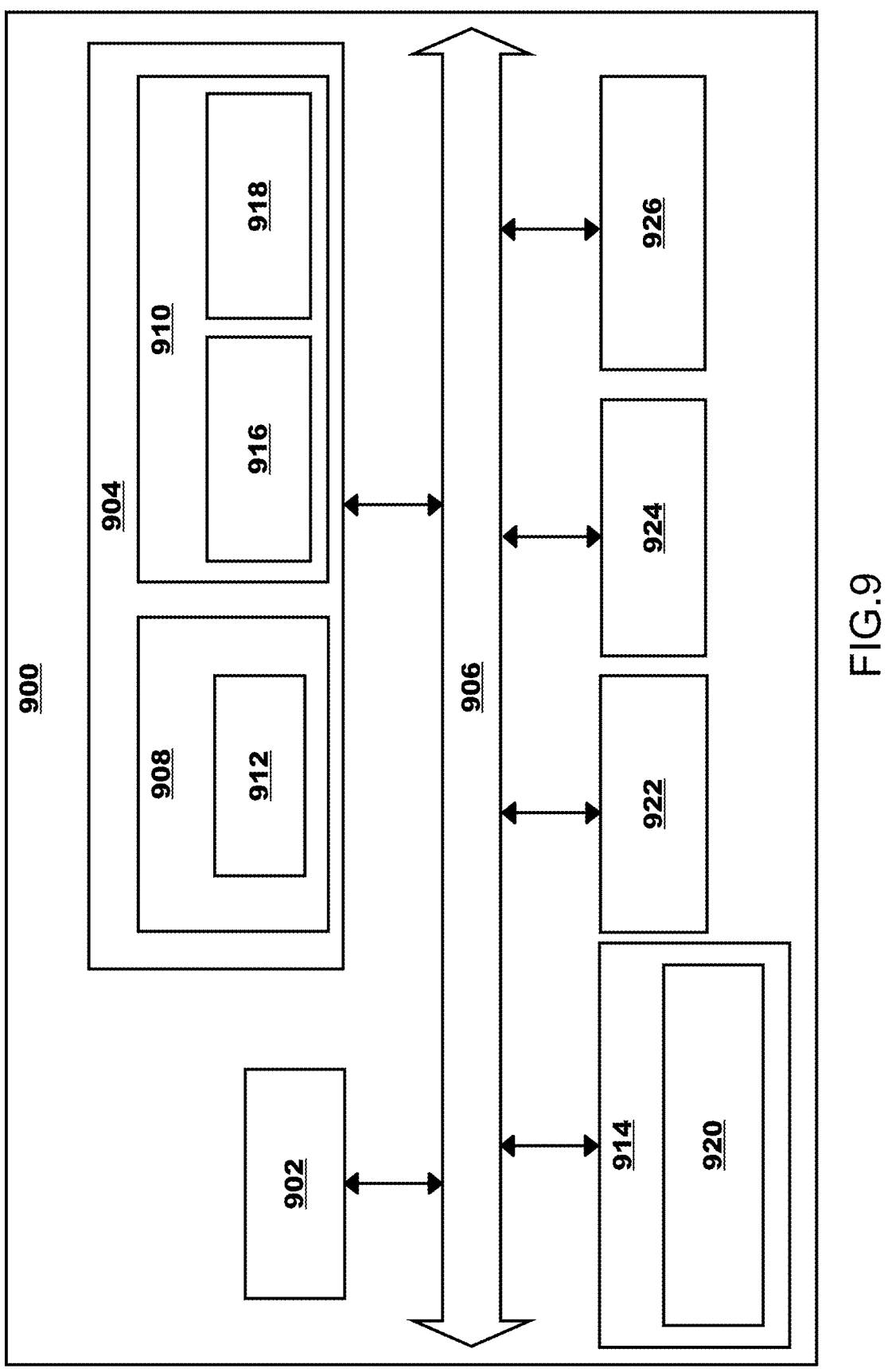
FIG. 9 is a schematic diagram of an exemplary computer system for implementing examples disclosed herein, according to an example.

FIG. 9 is a schematic diagram of a computer system 900 for implementing examples disclosed herein. The computer system 900 is adapted to execute instructions from a computer-readable medium to perform these and/or any of the functions or processing described herein. The computer system 900 may be connected (e.g., networked) to other machines in a LAN, an intranet, an extranet, or the Internet. While only a single device is illustrated, the computer system 900 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, ethernet etc.

The computer system 900 may comprise at least one computing device or electronic device capable of including firmware, hardware, and/or executing software instructions to implement the functionality described herein. The computer system 900 may include processing circuitry 902 (e.g., processing circuitry including one or more processor devices or control units), a memory 904, and a system bus 906. The computer system 900 may include at least one computing device having the processing circuitry 902. The system bus 906 provides an interface for system components including, but not limited to, the memory 904 and the processing circuitry 902. The processing circuitry 902 may include any number of hardware components for conducting data or signal processing or for executing computer code stored in memory 904. The processing circuitry 902 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 902 may further include computer executable code that controls operation of the programmable device.

The system bus 906 may be any of several types of bus structures that may further interconnect to a memory bus (with or without a memory controller), a peripheral bus, and/or a local bus using any of a variety of bus architectures. The memory 904 may be one or more devices for storing data and/or computer code for completing or facilitating methods described herein. The memory 904 may include database components, object code components, script components, or other types of information structure for supporting the various activities herein. Any distributed or local memory device may be utilized with the systems and methods of this description. The memory 904 may be communicably connected to the processing circuitry 902 (e.g., via a circuit or any other wired, wireless, or network connection) and may include computer code for executing one or more processes described herein. The memory 904 may include non-volatile memory 908 (e.g., read-only memory (ROM), erasable programmable read-only memory (EPROM), electrically erasable programmable read-only memory (EEPROM), etc.), and volatile memory 910 (e.g., random-access memory (RAM)), or any other medium which can be used to carry or store desired program code in the form of machine-executable instructions or data structures and which can be accessed by a computer or other machine with processing circuitry 902. A basic input/output system (BIOS) 912 may be stored in the non-volatile memory 908 and can include the basic routines that help to transfer information between elements within the computer system 900.

The computer system 900 may further include or be coupled to a non-transitory computer-readable storage medium such as the storage device 914, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 914 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 914 and/or in the volatile memory 910, which may include an operating system 916 and/or one or more program modules 918. All or a portion of the examples disclosed herein may be implemented as a computer program 920 stored on a transitory or non-transitory computer-usable or computer-readable storage medium (e.g., single medium or multiple media), such as the storage device 914, which includes complex programming instructions (e.g., complex computer-readable program code) to cause the processing circuitry 902 to carry out actions described herein. Thus, the computer-readable program code of the computer program 920 can comprise software instructions for implementing the functionality of the examples described herein when executed by the processing circuitry 902. In some examples, the storage device 914 may be a computer program product (e.g., readable storage medium) storing the computer program 920 thereon, where at least a portion of a computer program 920 may be loadable (e.g., into a processor) for implementing the functionality of the examples described herein when executed by the processing circuitry 902. The processing circuitry 902 may serve as a controller or control system for the computer system 900 that is to implement the functionality described herein.

The computer system 900 may include an input device interface 922 configured to receive input and selections to be communicated to the computer system 900 when executing instructions, such as from a keyboard, mouse, touch-sensitive surface, etc. Such input devices may be connected to the processing circuitry 902 through the input device interface 922 coupled to the system bus 906 but can be connected through other interfaces, such as a parallel port, an Institute of Electrical and Electronic Engineers (IEEE) 1394 serial port, a Universal Serial Bus (USB) port, an IR interface, and the like. The computer system 900 may include an output device interface 924 configured to forward output, such as to a display, a video display unit (e.g., a liquid crystal display (LCD) or a cathode ray tube (CRT)). The computer system 900 may include a communications interface 926 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A transport asset monitoring system for monitoring operating states of one or more transport assets;

wherein the transport asset monitoring system comprises one or more processor devices;

wherein the transport asset monitoring system comprises at least one control unit arranged in each of the one or more transport assets, the at least one control unit configured to communicate wirelessly over a network, and the one or more processor devices configured to execute a respective state machine associated with each of the one or more transport assets;

wherein each state machine implements a plurality of operating states, out of which operating states at least one state can be categorized as a productive state and at least one state can be categorized as an unproductive state;

wherein the transport asset monitoring system further comprises a sensor system arranged in each of the one or more transport assets and configured to:

detect a current operating state for each state machine;

exchange data between transport assets; and update each state machine, respectively, based on the exchanged data;

wherein the sensor system comprises one or more V2X communication systems associated with the respective state machines and used to exchange data between transport assets, the data being used to update the state machines associated with an interaction between one transport asset and another transport assets;

wherein the categorization of the current operating state of at least one state machine as productive or as unproductive is performed by the control unit and is based on a determined correlation, by the control unit, between the current operating state of a state machine of one transport asset and the current operating state of another state machine of another transport asset and a detected dependency between the transport assets based on the correlation; and wherein the control unit is configured to:

determine a correlation between the current operating state of the state machine of a transport asset and another current operating state of another state machine of another transport asset;

detect a dependency between the one transport asset and the other transport asset based on the correlation;

identify an inefficiency based on the at least one state being categorized as the unproductive state;

aggregate the current operating states of a plurality of transport assets into a transport asset utilization determined for the one or more transport assets, including the inefficiency, the transport asset utilization being based on correlated states and dependency of the state machines;

plan a task or a transport route of at least one of the transport assets to address the inefficiency based on the determined transport asset utilization; and communicate the task or the transport route over the network to an external device.

2. The transport asset monitoring system of claim 1, wherein the one or more transport assets comprises at least one heavy-duty transport vehicle selected from the group consisting of trucks, buses, trailers, semi-trailers, and rigids, and wherein the transport asset monitoring system is configured to determine the transport asset utilization for the at least one heavy-duty transport vehicle.

3. The transport asset monitoring system according to claim 1, wherein the transport asset monitoring system is at least partly implemented on a remote server accessible via wireless link from the transport assets and/or from associated wireless devices.

4. The transport asset monitoring system according to claim 1, wherein a transition between two states of a first state machine in the transport asset monitoring system is conditioned on a current state of an associated second state machine.

5. The transport asset monitoring system according to claim 1, wherein the at least one control unit is arranged to categorize the current operating state of at least one state machine as productive or as unproductive based on the current operating state of at least one other state machine.

6. The transport asset monitoring system according to claim 1, wherein the at least one control unit is further arranged to determine a correlation between the operating states in one of the state machines with respect to the operating states of another state machine, and to detect a dependency between two transport assets based on the correlation.

7. The transport asset monitoring system according to claim 1, wherein the sensor system comprises one or more positioning systems associated with respective state machines.

8. The transport asset monitoring system according to claim 7, wherein the categorization of the current operating state of at least one state machine as productive or as unproductive is further based on position data from the one or more positioning systems, wherein the position data comprises at least a position associated with a state machine of one transport asset and another state machine of another transport asset.

9. The transport asset monitoring system according to claim 1, wherein the transport asset monitoring system is further configured to monitor one or more material handling assets, wherein the material handling assets are associated with one or more transport assets and wherein the system is configured to associate a respective state machine with each of the material handling assets;

wherein each of the respective state machine implements a plurality of operating states of the one or more material handling assets; and wherein the transport asset monitoring system is configured to aggregate the current operating states of the plurality of transport assets and of the material handling assets such that a transport asset utilization for the one or more transport assets is determined.

10. The transport asset monitoring system according to claim 9, wherein the categorization of the current operating state of at least one state machine as productive or as unproductive is based on a correlation between the current operating state of a state machine of one transport asset and the current operating state of another state machine of on material handling asset.

11. The transport asset monitoring system according to claim 1, wherein the current operating state comprises a state selected from a group of transporting, loading, unloading, stationary, waiting, underway and maintenance.

12. A computer implemented method executed in a transport asset monitoring system, for monitoring current operating states of one or more transport assets, the method comprising:

executing, by one or more processors, a respective state machine associated with each asset in the one or more transport assets, wherein each state machine implements a plurality of operating states, out of which operating states at least one state is categorized as a productive state and at least one state is categorized as an unproductive state;

detecting a current operating state for each state machine based on output data from a sensor system configured to detect the current operating state for each state machine, wherein the sensor system comprises one or more V2X communication systems associated with the respective state machines and used to exchange data between transport assets, the data being used to update the state machines associated with an interaction between one transport asset and another transport assets;

exchanging data between transport assets;

updating each state machine, respectively, based on the exchanged data;

wherein the categorization of the current operating state of at least one state machine as productive or as unproductive is based on a determined correlation between the current operating state of a state machine of one transport asset and the current operating state of another state machine of another transport asset and a detected dependency between the transport assets based on the correlation;

determining a correlation between the current operating state of the state machine of a transport asset and another current operating state of another state machine of another transport asset;

detecting a dependency between the one transport asset and the other transport asset based on the correlation;

identifying an inefficiency based on the at least one state being categorized as the unproductive state;

aggregating the current operating states of a plurality of transport assets into a transport asset utilization determined for the one or more transport assets, including the inefficiency, the transport asset utilization being based on correlated states and dependency of the state machines; and planning a task or a transport route of at least one of the transport assets to address the inefficiency; and communicating the task or the transport route over a network to an external device.

13. The computer implemented method of claim 12, wherein the transport asset monitoring system is further configured to monitor one or more material handling assets, wherein the material handling assets are associated with one or more transport assets, wherein the method further comprises associating a respective state machine with each of the material handling assets; wherein each of the respective state machine implements a plurality of operating states of the one or more material handling assets; and aggregating the current operating states of the plurality of transport assets and of the material handling assets such that the transport asset utilization for the one or more transport assets is determined.

14. A non-transitory computer readable medium storing a computer program comprising program code for performing the steps of claim 12, wherein the program code is run on a computer or on processing circuitry of at least one control unit.

* * * * *